United States Patent

Freudeberg et al.

[15] 3,701,982

[45] Oct. 31, 1972

[54] MEMORY MATRIX UNIT

[72] Inventors: Jurgen Freudeberg, Eiserfeld; Hermann Rudolff, Kreuztal-Buschht, both of Germany

[73] Assignee: U.S. Philips Corporation, New York, N.Y.

[22] Filed: Oct. 22, 1970

[21] Appl. No.: 82,961

[30] Foreign Application Priority Data

Oct. 24, 1969 Germany..........P 19 53 553.6

[52] U.S. Cl.........................340/174 MA, 340/174 M

[51] Int. Cl...............................................G11c 5/08

[58] Field of Search.................................340/174 M

[56] References Cited

UNITED STATES PATENTS 3,381,281 4/1968 Doughty et al........340/174 M 3,520,052 7/1970 Hoffmann.............340/174 M

FOREIGN PATENTS OR APPLICATIONS 704,063 2/1965 Canada.............340/174 MA

*Primary Examiner*—James W. Moffitt

*Attorney*—Frank R. Trifari

[57] ABSTRACT

A memory construction employing fields of cores arranged on both sides of a bilaterally printed circuit board, the electrical connections of the fields being established by lead through contacts, and including accessing and drive components on both sides of the bilaterally printed circuit.

4 Claims, 4 Drawing Figures

Figure 1:
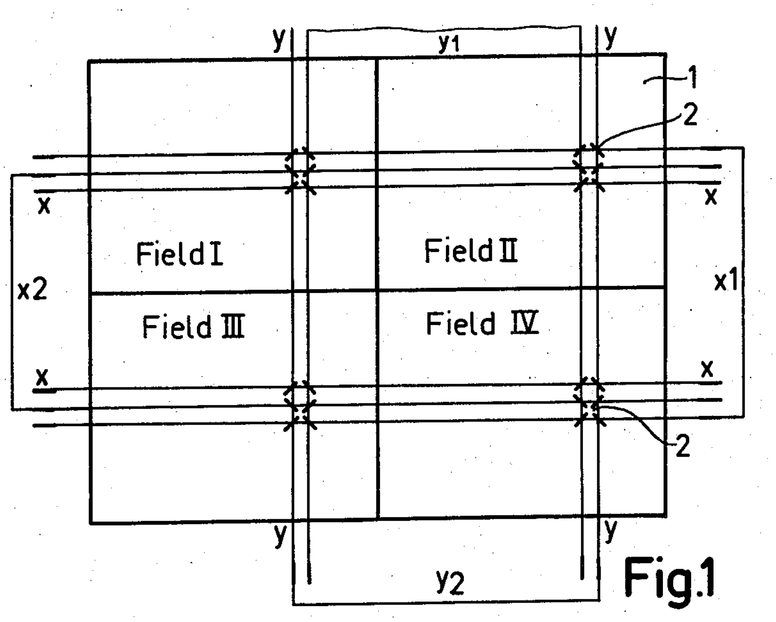

INVENTORS
JÜRGEN FREUDEBERG
HERMANN RUDOLFF
BY
AGENT

INVENTORS
JÜRGEN FREUDEBERG
HERMANN RUDOLFF

BY [signature]

AGENT

INVENTORS
JÜRGEN FREUDEBERG
HERMANN RUDOLFF

BY Frank R. Trifari

AGENT

MEMORY MATRIX UNIT

The invention relates to a memory matrix unit including a plane support of insulating material and a matrix comprising a plurality of fields and consisting of magnet cores arranged in lines and columns, in which the wires of the *n* planes, which wires are threaded through the cores, are connected without a frame to a printed circuit.

Known memory matrix units which are used in electronic data processing arrangements are built up from coordinate rows of magnetic ring cores and are arranged in such a manner that the wires are threaded through ring cores in at least two directions. Both ends of the wires threaded through the cores are secured in a characteristic manner to a connecting piece which is provided on a frame surrounding the core matrix in an insulating manner. The frame which is used for a memory system operating with coinciding currents is provided with laminations whose elongated lugs constitute the connection to the exterior. By suitable design of the elongated lugs it is possible to establish contact with other contact laminations. In a memory matrix system which is built up from a plurality of the previously mentioned memory frames the structure is obtained by stacking the memory frames in which, for example, the mutual connections are established by bending the lugs of the contact laminations of the adjacent memory frames towards one another and by connecting them together, for example, by soldering.

Furthermore, it is known to establish the connections of the individual memory frames by means of foils having printed tracks. These foils are flexible to a certain extent and permit a flexure in a space axis. By using such switching foils instead of conventional wiring, switching errors and the required substantially high test costs of checking the established connections are prevented.

The drawback of the known memory matrix units resides in the fact that miniaturization can only be realized to an insufficient extent. With respect to the miniaturization of the electric structural elements it is worthwhile to strive not only for the miniaturization of the electric or magnetic memory elements themselves, but also particularly for the miniaturization of the supporting and connecting members. Miniaturization of the core dimensions results at the same time in the advantages of shorter switching times as well as smaller spatial dimensions. Miniaturization of the spatial dimensions results in shorter periods of the pulses in the wires coupled to the cores.

When using cores of small dimensions, considerable problems occur when connecting wire ends of the wires threaded through the cores, because these wires are to be connected to the electronic control and read circuits.

An account of the considerations mentioned hereinbefore, the essential problems in the structure of a core memory thus are the spatial dimensions, the reliability which can be achieved in the structure and circuitry with other structural elements, the number of electric connections to the exterior required for comparatively large memories, and the height of the cost.

An object of the present invention is to provide a magnetic memory matrix unit which provides an optimum solution for the previously mentioned criteria while utilizing the known feature that core memory meshes can be electrically connected without a frame to the printed circuits used in electronics. According to the invention this is achieved in that the fields of the core memory unit are provided on both sides of a bilaterally printed circuit board, and that the electrical connections of the bilaterally provided core memory meshes are established by means of lead-through contact, and that the electrical connections of the memory matrix wires which can be grouped in accordance with the desired selection principle can be established on both sides of the bilaterally printed circuit.

In a further advantageous embodiment the printed tracks required for grouping the memory matrix wires may be provided below the core memory meshes. To reduce the electrical connections the decoupling diodes, read amplifiers and/or drive circuits are provided on the bilaterally printed circuit board. The distances between the lead-out wires of the memory matrix are adapted to the connecting distances between the integrated decoupling diodes accommodated in standard holders.

Figure 2:
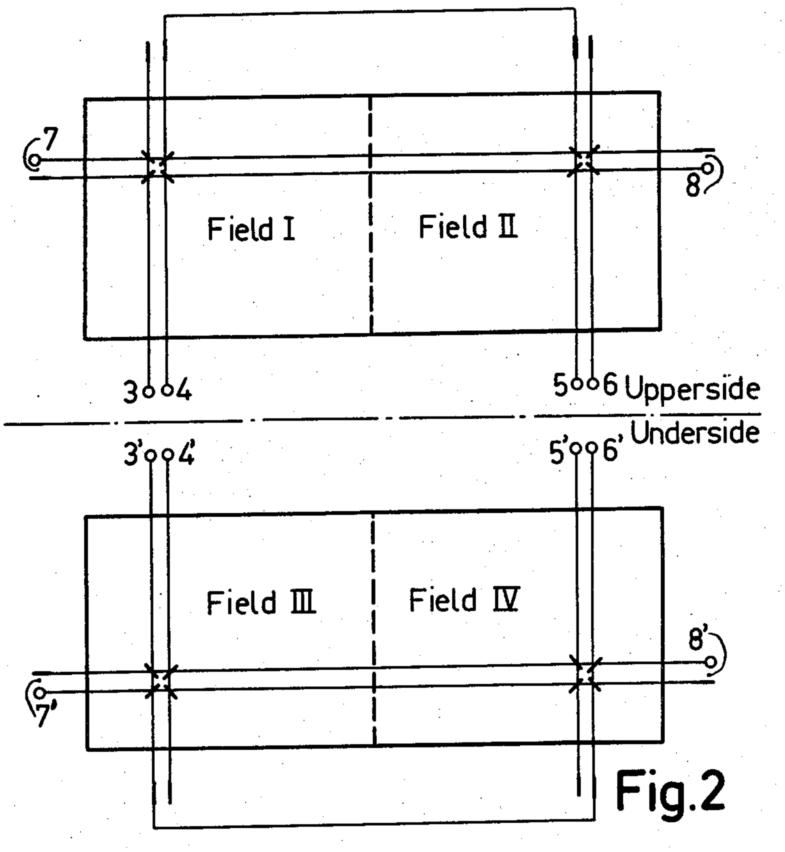
Figure 3:
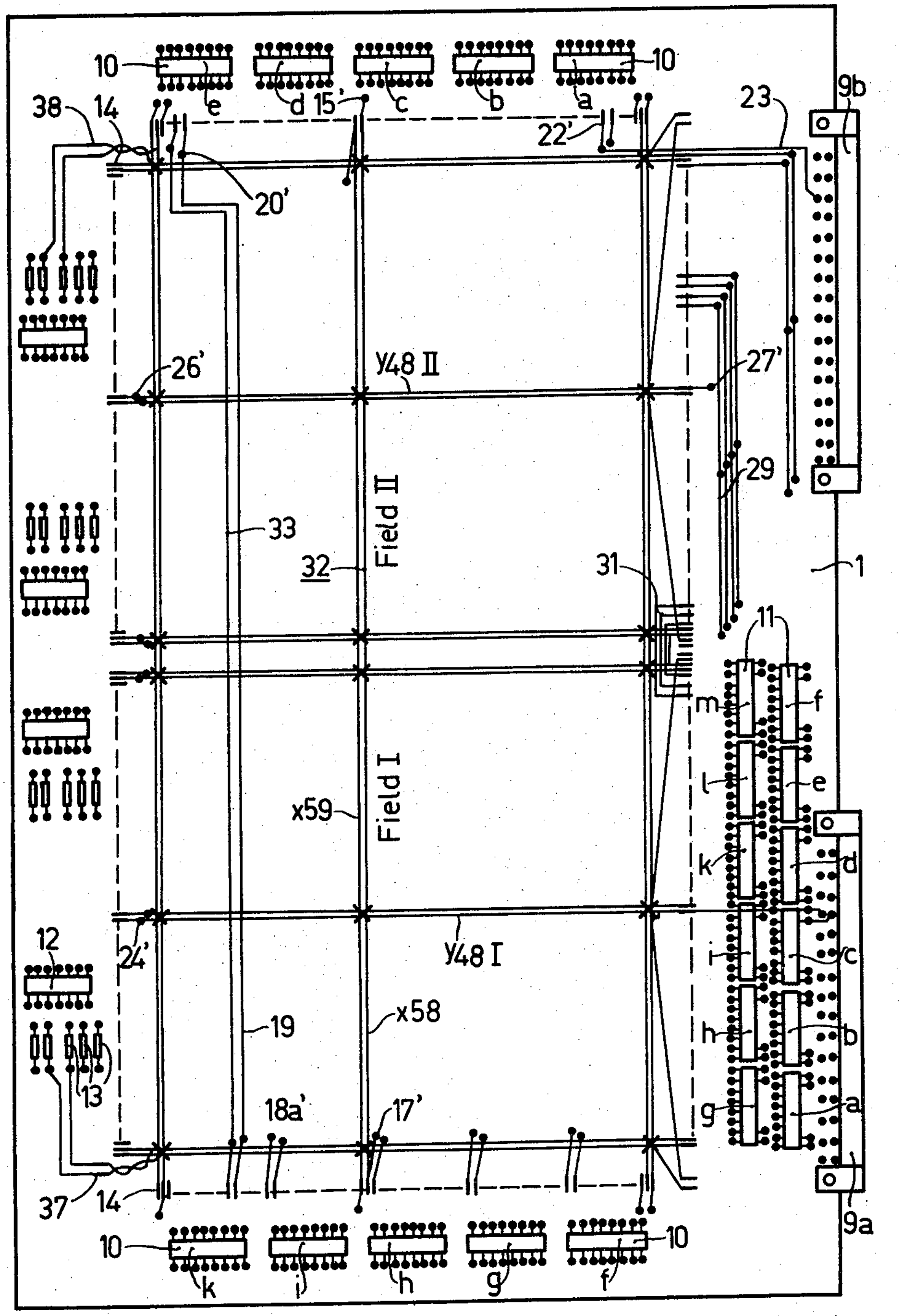
Figure 4:
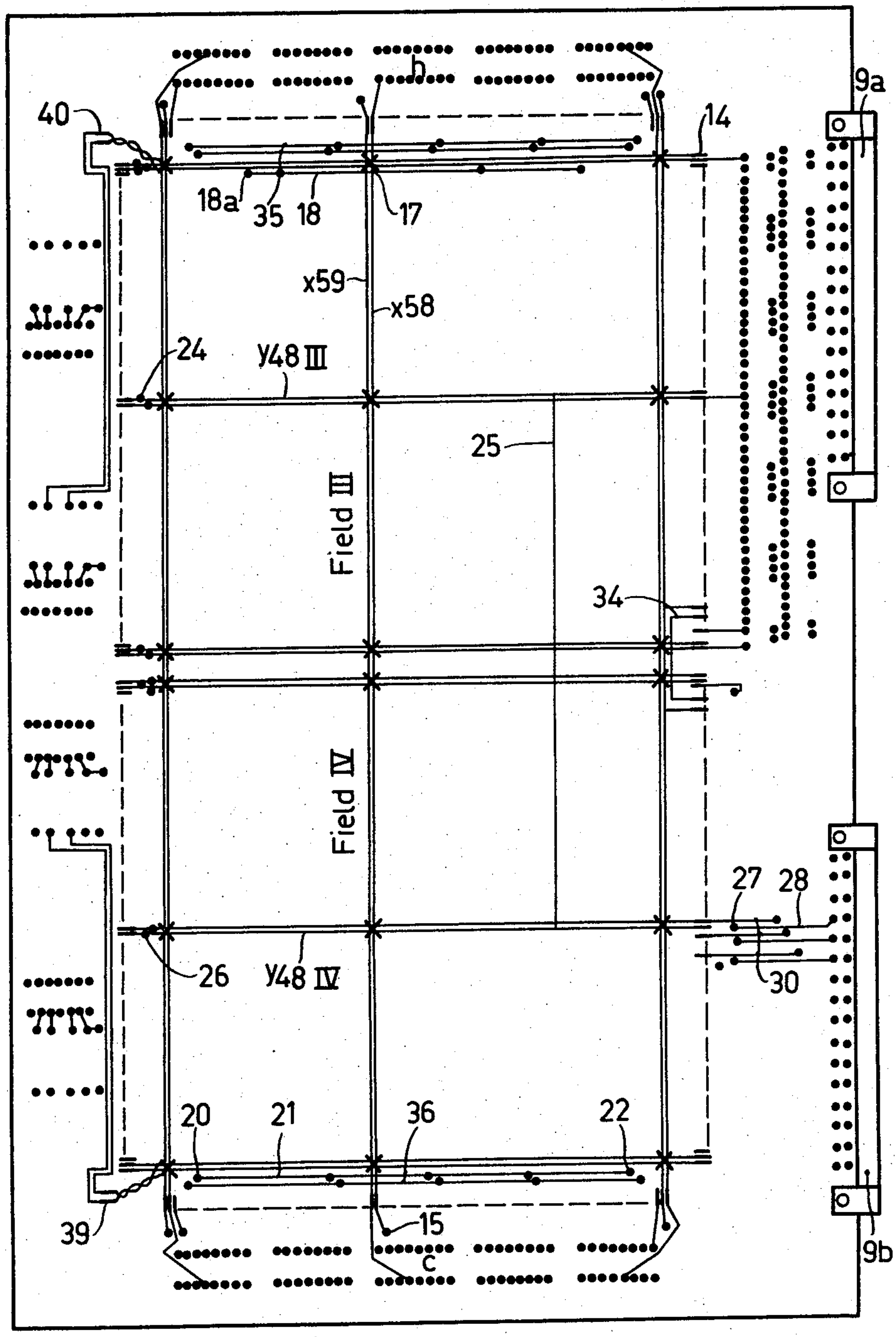

In order that the invention may be readily carried into effect, a few embodiments thereof will now be described in detail, by way of example with reference to the accompanying diagrammatic drawings in which FIG. 1 shows the principal structure of a known memory matrix unit, FIG. 2 shows the structure of the unit of FIG. 1 according to the invention, FIG. 3 is a front view of an embodiment according to FIG. 2, and FIG. 4 is a front view of the memory matrix unit of FIG. 3, rotated 180°.

As is shown in FIG. 1, the complete memory matrix unit is accommodated in a single plane 1 consisting of four fields I to IV. The plane consists of a printed circuit board 1 upon which core memory meshes 2 are provided. The memory matrix wires (*x* and *y*) are threaded through all fields I to IV. For reasons of location and switching techniques the arrangement is such that the connecting wires *x*1, *x*2, *x*3 . . . etc and *y*1, *y*2, *y*3, . . . etc are alternatively arranged on both sides.

FIG. 2 shows the structure of the memory matrix unit of FIG. 1 according to the invention, in which the fields I and II are in the same position and the fields III and IV are rotated 180° and are provided on the rear side of the printed circuit board 1. The connecting points resulting from this structure of the fields I to IV, for example, 3—3′ . . . 6—6′ are established by means of lead-through contacts through the printed conductor board. The connecting wires *x*1 . . . shown in FIG. 1 are likewise replaced by lead-through contacts, for example, 7—7′ and 8—8′ as shown in FIG. 2 according to the invention. Due to the arrangement according to the invention of the memory matrix meshes on both sides of a printed circuit board 1 it is achieved with the same switching technical structure that, with reference to FIG. 1, the storage capacity to be provided according to FIG. 2 only needs half the space. Due to this arrangement the relatively expensive core memory frames may be omitted. Further advantages of the memory matrix unit according to FIG. 2 will follow from the description of an embodiment according to FIG. 3.

According to FIG. 3 the memory matrix unit consists of a printed circuit board 1 and two contact strips 9*a* and 9*b* soldered thereto. The core memory meshes 2 are arranged on both sides in the central field of the circuit board 1. Peripherously located to the core memory meshes 2 are both the integrated decoupling diodes 10 and 11 accommodated in standard holders, for example, dual in line or flat-pack, and the read amplifiers 12 with their associated resistors 13. The memory matrix wires *x* and *y* are secured on both sides by means of separate connecting laminations 14.

The cores 2 are energized by driver circuits (not shown) on the printed circuit board 1, the outputs of said driver circuits being connected through the contact strips 9a and 9b and the decoupling diodes 10 and 11 being connected to the memory matrix wires *x* and *y*. The integrated decoupling diodes 10 and 11, which essentially contribute to the limitation of error possibilities in mounting the assembly as well as to the compactness of the memory, comprise diode pairs in which the diode which is switched in the pass direction determines the current direction in the wire for writing or reading. In this case the decoupling diodes 10 and 11 are grouped in accordance with the selection principle used.

When considering, for example, the course of the line lead *x*58, then it is found that it is energized through the decoupling diode pair of the diode group 10*h* according to FIG. 4. The lead passes through the fields III and IV up to the corresponding connecting lamination 14 and furthermore through the lead-through connection 15—15′ (FIG. 3) and passes the fields II and I up to the corresponding connecting lamination 14. In conformity with the desired grouping an electrical connection to the drive circuits present from the connecting lamination 14 through a further lead-through connection 17′—17, conductor track 18 (FIG. 4) lead-through connection 18*a*—18*a*′, conductor track 19 (FIG. 3),lead-through connection 20′—20 conductor track 21, lead-through connection 22—22′ and conductor track 23. The line lead *x*59 is energized through a diode pair of the decoupling diodes 10*c*. The further course is analogous to that of the line lead *x*58.

The column leads *yi* . . . *yn* are energized through the diode pairs of the decoupling diodes 11*a* . . . *m*. When considering, for example, the column lead y48 it is found that it is energized through the decoupling diodes 11c. The lead y48 passes through the field I contact lamination 14, lead-through contact 24′—24, field III ($y48_{III}$), contact lamination 14, conductor track 25 (FIG. 4), contact lamination 14, lead $y48_{IV}$ (FIELD IV) lead-through contact 26—26′, lead $y48_{II}$ (FIG. 3, field II), lead-through contact 27′—27 and conductor track 28 to the contact strip 9*b*. The conductor tracks 31 to 36 are present below the core memory meshes 2, the conductor tracks 29 and 30 serving for the grouping.

The mutual distance between the memory matrix wires *x* and *y* is determined by the size of the core. In the memory described as an embodiment, the distance between the memory matrix wires *x* and *y* is limited on the lower side by the distance between the connecting points and the contact laminations 14 which distance cannot be made arbitrarily small. This principal drawback is advantageously utilized in this invention in that corresponding decoupling diodes 10 and 11 accommodated in standard holders are used whose outputs may be directly connected to the driver or switching stages. In this embodiment every other column or line wire (*y* or *x*) is connected to a diode pair (10 or 11) within the integrated circuit while a lead-through contact (*x*-leads) is situated between two matrix wires *x* or *y*, and one conductor track 31, 34 leads to the other memory field. The distances between the wires are thus adapted to the diodes 10, 11 used, and this in such a manner that a rectilinear conductor track is possible.

As a further advantage the read amplifiers 12 are provided on the printed circuit board 1 so that the shortest possible connections result between the amplifier input and the core memory mesh 2. The read wires 37–40 threaded through the individual fields I–IV of the core memory meshes are connected to the corresponding read amplifiers 12 through printed conductor tracks.

By combining the core memory mesh 2 itself as well as the decoupling diodes 10 and 11 and the read amplifiers 12 on one and the same printed circuit board 1 it is ensured that the required connections with the computer are reduced to a minimum. Furthermore, there is the possibility to accommodate also the driver circuits on the printed circuit board 1.

What is claimed is:

1. A memory matrix unit including a plane support of insulating material and a matrix comprising a plurality of fields of magnetic cores arranged in lines and columns, the wires of said plane being threaded through the cores and terminated at a printed circuit formed on a printed circuit board, said fields of the memory matrix unit provided on both sides of said board, said board having bilaterally printed circuits, a plurality of lead through contacts establishing electrical connections between bilaterally provided core memory meshes, and means for electrically connecting groups of memory matrix wires in accordance with a desired selection principle on both sides of said board containing said bilaterally printed circuit.

2. A memory matrix unit as claimed in claim 1, wherein said printed conductors form tracks for grouping the memory matrix wires below the core memory meshes.

3. A memory matrix unit as claimed in claim 1, wherein decoupling diodes, read amplifiers and/or drive circuits are mounted directly on the bilaterally printed circuit board for reducing electrical connections.

4. A memory matrix unit as claimed in claim 1, wherein said distances between the lead-out wires of the memory matrix are adapted to the connecting distances between the integrated decoupling diodes accommodated in standard holders.

* * * * *